«12» United States Patent  
Bell et al.

(10) Patent No.: US 7,549,802 B2  
(45) Date of Patent: Jun. 23, 2009

(54) FIBER OPTIC CONNECTOR

(75) Inventors: George N. Bell, Stormville, NY (US); Richard D. Pinsonneault, Jackson, NJ (US); John L. Carey, Jr., Haymarket, VA (US); Kevin N. Smith, Phillipsburg, NJ (US); William R. Belben, Belle Mead, NJ (US)

(73) Assignee: Verizon Services Corp., Arlington, VA (US)

( * ) Notice: Subject to any disclaimer, the term of this patent is extended or adjusted under 35 U.S.C. 154(b) by 6 days.

(21) Appl. No.: 11/770,125

(22) Filed: Jun. 28, 2007

(65) Prior Publication Data

US 2009/0003793 A1 Jan. 1, 2009

(51) Int. Cl.  
*G02B 6/36* (2006.01)

(52) U.S. Cl. .............................. 385/78; 385/53; 385/76; 385/77

(58) Field of Classification Search ............... 385/53, 385/76–78  
See application file for complete search history.

(56) References Cited

U.S. PATENT DOCUMENTS

| 5,448,667 | A | * | 9/1995 | Arii et al. | 385/49 |
| 5,542,015 | A | * | 7/1996 | Hultermans | 385/60 |
| 5,559,919 | A | * | 9/1996 | Solberg | 385/92 |
| 6,522,485 | B2 | * | 2/2003 | Jokura | 359/811 |
| 6,899,467 | B2 | * | 5/2005 | McDonald et al. | 385/78 |
| 6,916,120 | B2 | * | 7/2005 | Zimmel et al. | 385/78 |
| 6,926,793 | B2 | * | 8/2005 | Nonomura et al. | 156/293 |
| 7,031,567 | B2 | * | 4/2006 | Grinderslev et al. | 385/34 |

\* cited by examiner

*Primary Examiner*—Jennifer Doan

(57) ABSTRACT

A fiber optic connector may include a first cover with an integral restraining mechanism and a second cover with a reciprocal restraining mechanism. A fiber optic cable having a ferrule at a terminating end may be placed within the fiber optic connector. A dust cap may be placed on the terminating end of the fiber optic cable. The integral restraining mechanism and the reciprocal restraining mechanism may detachably mate and enclose the terminating end of the fiber optic cable within the fiber optic connector. The fiber optic connector may include one or more gaskets to assist in sealing the connector.

20 Claims, 8 Drawing Sheets

FIBER OPTIC CONNECTOR

BACKGROUND INFORMATION

Telecommunication providers (TELCOs) are making significant investments in fiber infrastructure in order to deliver fiber-based services to their customers. A major limiting factor in implementing fiber services is cost. In addition to installing fiber optic cables, there is a relatively high cost in preparing the end of each fiber optic cable to interface with optical devices. These prepared fiber optic cable ends may need to pass through small conduits to enter into an end users' premises and may also need to withstand external environments.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION

The following description is intended to convey a thorough understanding of the embodiments described by providing a number of specific embodiments and details involving systems and methods for implementing a fiber optic connector. It should be appreciated, however, that the present disclosure is not limited to these specific embodiments and details, which are exemplary only. It is further understood that one possessing ordinary skill in the art, in light of known systems and methods, would appreciate the use of the disclosures for its intended purposes and benefits in any number of alternative embodiments, depending upon specific design and other needs.

According to exemplary embodiments of the present application, a fiber optic connector may include a first cover with an integral restraining mechanism and a second cover with a reciprocal restraining mechanism. A fiber optic cable having a ferrule at a terminating end may be placed within the fiber optic connector. A dust cap may be placed on the terminating end of the fiber optic cable. The integral restraining mechanism and the reciprocal restraining mechanism may detachably mate and enclose the terminating end of the fiber optic cable within the fiber optic connector. The fiber optic connector may include one or more gaskets to assist in sealing the connector.

Figure 1:
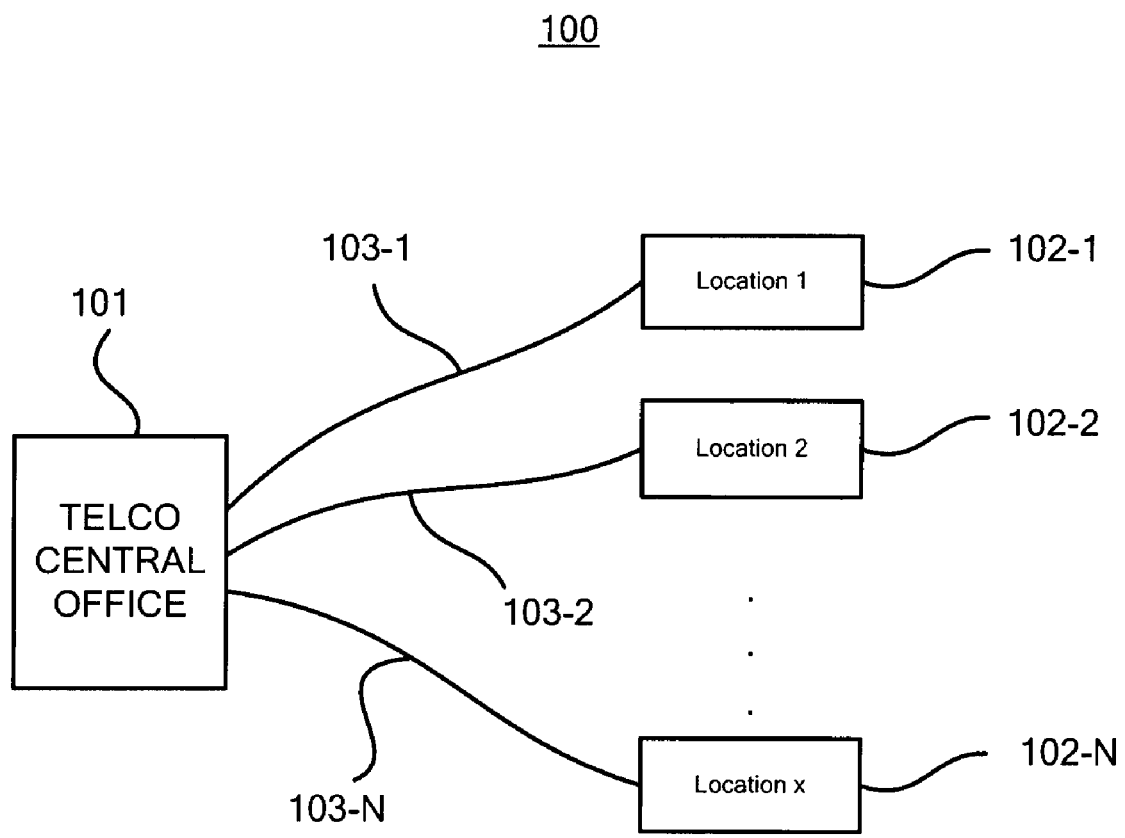
FIG. 1 illustrates an exemplary network architecture of an optical fiber network in accordance with an exemplary embodiment of the present disclosure.

FIG. 1 illustrates an exemplary network architecture of an optical fiber network 100 in accordance with an exemplary embodiment of the present disclosure. At a high level, at one end of the network 100 may be a fiber services end provider, a TELCO central office 101, and at the other end, a plurality of fiber services consumers 102-1, 102-2, . . . , 102-N interconnected by one or more fiber optic cables 103-1, 103-2, . . . 103-N. In the example of FIG. 1, the plurality of fiber services consumers 102-1, 102-2, . . . , 102-N are labeled as location 1, location 2, . . . , location x. The plurality of fiber services consumers 102 may comprise businesses and individual consumers, and may comprise individual installations as well as multiple dwelling units (MDUs), such as apartment and condominium buildings. Though not shown in FIG. 1, one or more optical components such as filters, repeaters, splitters, switches, etc., may exist between the TELCO central office 101 and the plurality of fiber services consumers 102.

Figure 2:
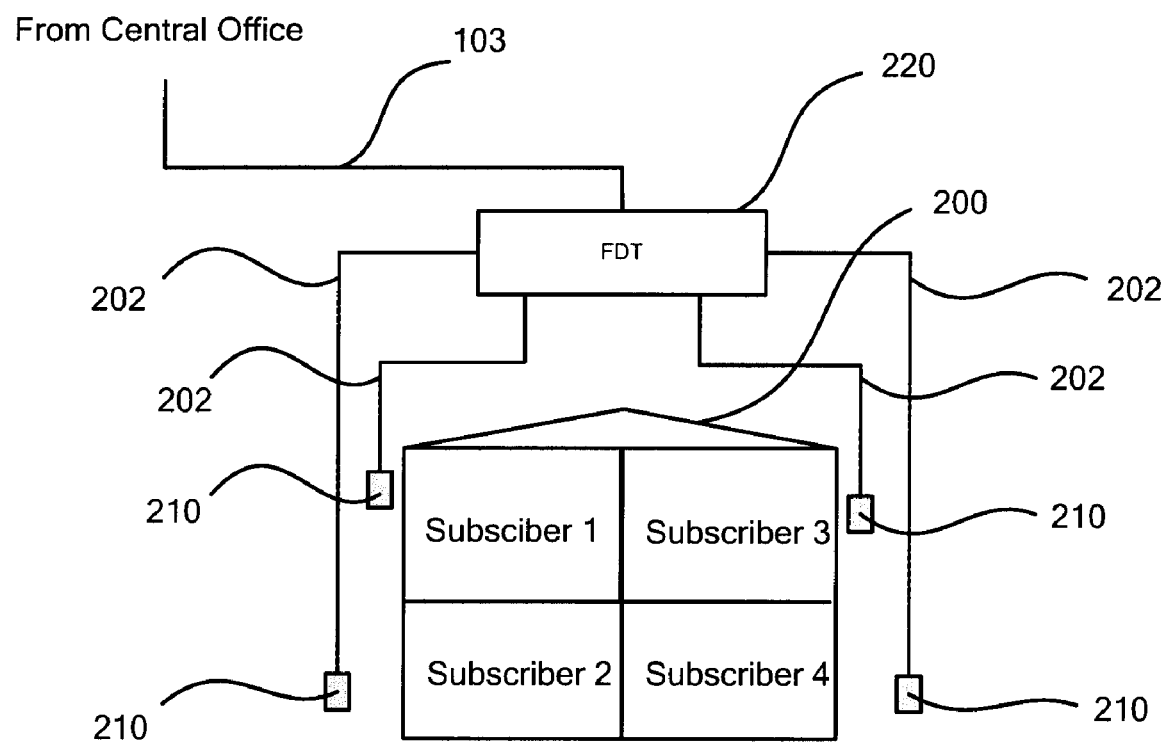
FIG. 2 illustrates a schematic diagram of deployment of optical fiber cable to a specific location "x" in accordance with an exemplary embodiment of the present disclosure.

FIG. 2 illustrates a schematic diagram of deployment of optical fiber cable to a specific location "x" in accordance with an exemplary embodiment of the present disclosure. In such a deployment a fiber optic cable 103 from a TELCO central office 101 (not shown) is deployed to location "x". The fiber optic cable 103 (which may be a "trunk") may enter a fiber distribution terminal (FDT) unit 220, and a plurality of fiber optic cables 202 may exit the FDT 220. The plurality of fiber optic cables 202 may provide service to each of the subscriber locations 1, 2, 3, and 4. Typically, the fiber optic cables 202 are installed at once, in anticipation of subscription. That is, one or more fiber optic cables 202 may be run from the FDT 220 to areas near an anticipated entry point of each of the subscriber locations 1, 2, 3 and 4. After the fiber optic cables 202 and other hardware are in place, the TELCO may use, for example, mail, in person, telephone and/or email based marketing to solicit the residents of MDU 200 to subscribe to optical services. When a subscriber subscribes to optical services, a technician or installer connects one of the fiber optic cables 202 to a terminal equipment at the subscriber's premise. This may comprise drilling a hole in an external wall, window unit or other surface of the subscriber's unit and then running one of the fiber optic cables 202 through the hole, or running the fiber optic cable 202 through an existing conduit.

Typically, TELCOs preconnectorize the fiber optic cables 202. That is, each of these fiber optic cables 202 may include a fiber optic connector 210 that is ready to be connected to one or more pieces of end user equipment, such as a modem, phone, router, set-top box or other equipment.

In the time between placement of the fiber optic cable cables 202 and subscription to optical services, the fiber optic cables 202 may remain outside the MDU 200 for some time and exposed to the elements. Due to exposure to the elements (e.g., heat, moisture, dust, frost), the fiber optic connectors 210 at the end of the fiber optic cables 202 may suffer degradation. In existing systems, if degradation occurs, the installer may have to replace the affected fiber optic cable 202. Such an incident may increase the cost of the installation. Accordingly, various embodiments of the present disclosure may provide a fiber optic connector 210 including an integral cover, a portion of which may be discarded when the attached fiber optic cable 202 is to be connected to the residential unit.

Thus, the fiber optic cables 202 may be protected against harsh environments until they may be pulled through conduits respectively to enter the end users' premises for connection with optical devices.

Figure 3:
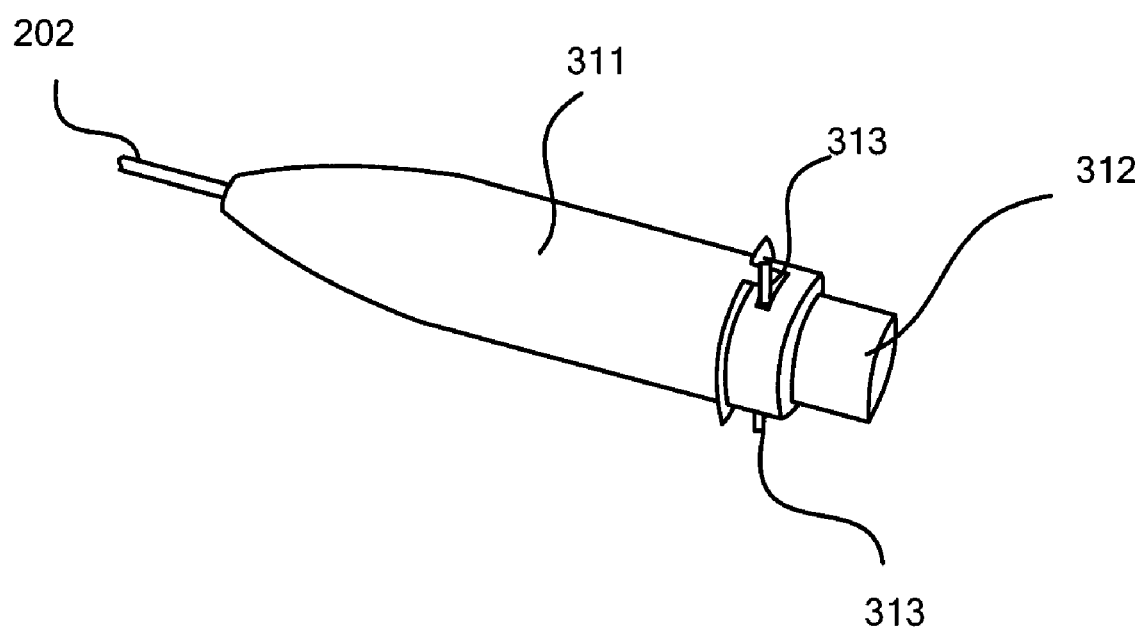
FIG. 3 illustrates a schematic diagram of a fiber optic connector in accordance with an exemplary embodiment of the present disclosure.

FIG. 3 illustrates a schematic diagram of a fiber optic connector 210 in accordance with an exemplary embodiment of the present disclosure. Such a fiber optic connector 210 may have a reduced overall size as compared to conventional connectors due to absence of a typical ferrule shroud. The fiber optic connector 210 is adapted to receive a fiber optic cable 202 having a shroudless ferrule 401 (shown in FIG. 4) located at a distal end, with the shroudless ferrule 401 being shielded inside a cover 311. The fiber optic cable 202 may be one of a variety of standard indoor or outdoor fiber optic cables as are known in the art. In this exemplary embodiment, the fiber optic cable 202 may be a cable manufactured by Nippon Telegraph and Telephone Corporation of Tokyo, Japan. The fiber optic connector 210 according to this embodiment comprises one or more lock pins 313 that secure the cover 311 to a removable cover 312. Other mechanisms, such as, but not limited to, threads, or snap on latches may be used to fasten the removable cover 312 to the cover 311. The removable cover 312 terminates the fiber optic connector 210 by mounting on a distal end of the cover 311, thereby enclosing the fiber optical cable 202. The fiber optic connector 210 as depicted in FIG. 3 may be of such size that it may be pulled through a conduit with a diameter of equal or less than three-eighths of an inch (⅜").

Figure 4:
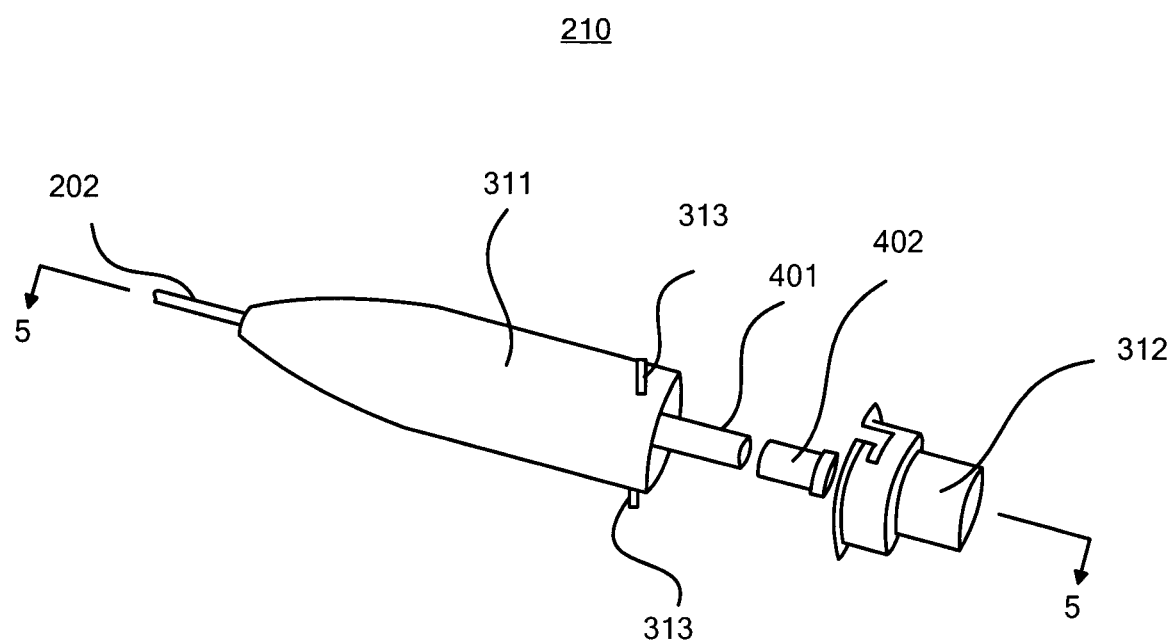
FIG. 4 illustrates an exploded view of the fiber optic connector of FIG. 3 in accordance with an exemplary embodiment of the present disclosure.

FIG. 4 illustrates an exploded view of the fiber optic connector 210 of FIG. 3 in accordance with an exemplary embodiment of the present disclosure. As shown in FIG. 4, a shroudless ferrule 401 terminates the fiber optic cable 202, and a dust cap 402 may be used to cover the shroudless ferrule 401 when the fiber optic cable 202 is not connected to a reciprocal optical connector. The contact surface of the fiber optic cable 202, e.g., the terminating end, may include the shroudless ferrule 401 and a fiber 504 (shown in FIG. 5), and may be polished. For example, the shroudless ferrule 401 and the fiber 504 may be polished to a finish that conforms to one of a variety of industry standard finishes for fiber optic connectors, such as, but not limited to, a finish of type Physical Contact (PC), Angled Physical Contact (APC), or Ultra Physical Contact (UPC). In this embodiment, the shroudless ferrule 401 may be a polished finish of type APC. The dust cap 402 may be an industry standard dust cap for an optical fiber. It is noted that the dust cap 402 may not be necessary if the removable cover 312 may also function as a dust cap to terminate the polished surface of the shroudless ferrule 401.

Figure 5:
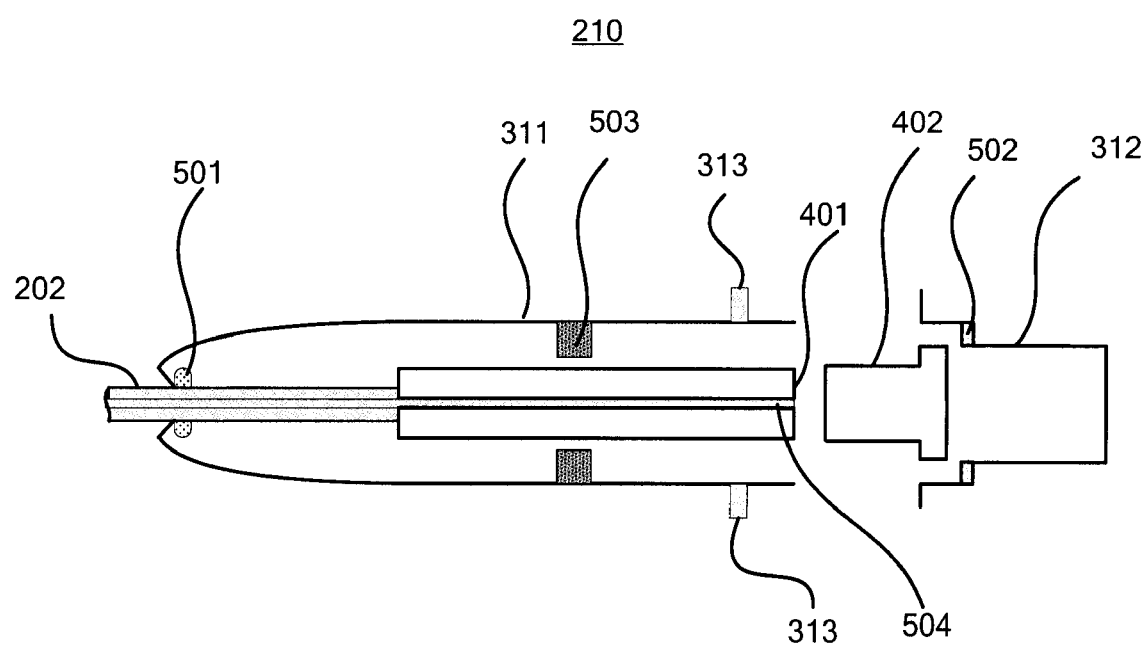
FIG. 5 illustrates a cross-sectional view of the fiber optic connector according to FIG. 4 along line 5-5 in accordance with an exemplary embodiment of the present disclosure.

FIG. 5 illustrates a cross-sectional view of the fiber optic connector 210 according to FIG. 4 along line 5-5 in accordance with an exemplary embodiment of the present disclosure. The fiber optic connector 210 may include one or more sealing gaskets, e.g., sealing gaskets 501 and 502. The first sealing gasket 501 may provide a seal at the end of the cover 311 where the fiber optic cable 202 enters the cover 311. The seal may assist in preventing water, dirt, dust and/or other environment hazards from entering the fiber optic connector 210 through this end of the cover 311. A second sealing gasket 502 may provide a similar seal for the removable cover 312 when the removable cover 312 is detachably mounted on the cover 311. A ferrule spacer 503 may secure the shroudless ferrule 401 at the radial center of the cylindrical cavity of the cover 311. In this embodiment, the ferrule spacer 503 may be attached to the cover 311. In other embodiments in accordance to the present disclosure, the ferrule spacer 503 may move substantially freely along the inner surface of the cover 311.

Figure 6:
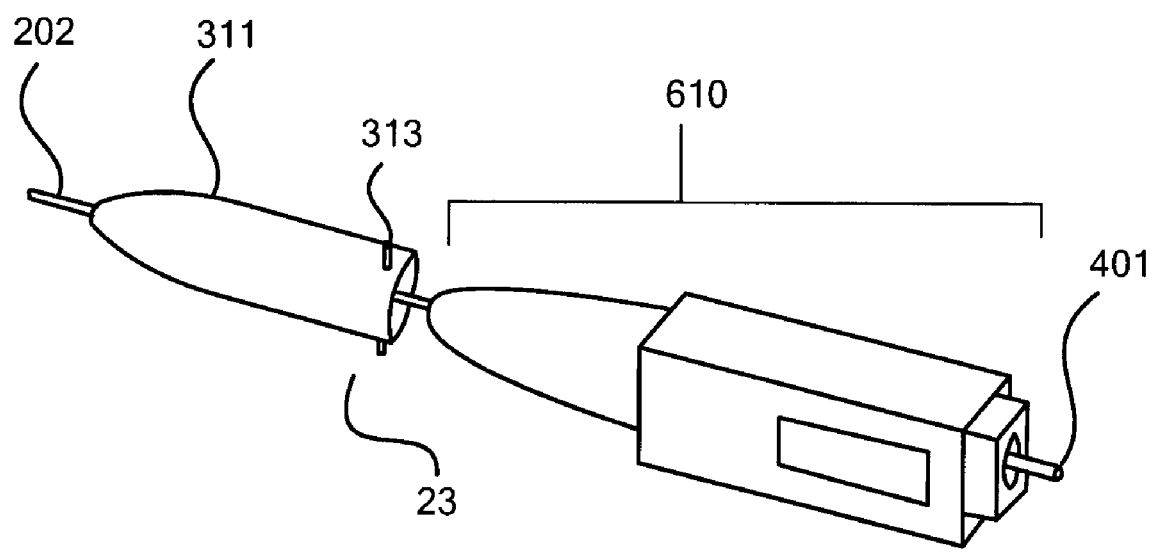
FIG. 6 illustrates a schematic diagram of a fiber optic connector with a connector shroud in accordance with an exemplary embodiment of the present disclosure.

FIG. 6 illustrates a schematic diagram of a fiber optic connector 210 with a connector shroud in accordance with an exemplary embodiment of the present disclosure. For example, upon request of subscription, a technician may go to the "x" location to complete the fiber optic connection to a device inside the subscriber's premise. The technician may pull one of the fiber optic connectors 210 and the attached fiber optic cable 202 through a small conduit into the subscriber's premise. Once the fiber optic connector 210 is pulled inside, the technician may unlock and remove the removable cover 312. The cover 311 then may be slid along the fiber optic cable 202 away from the end of the fiber optic cable 202 to expose the shroudless ferrule 401 terminating the fiber optic cable 202. In the embodiment of the fiber optic connector 210 depicted in FIG. 5, the technician may also remove the dust cap 402. In another embodiment in accordance with the present disclosure, the removable cover 312 may also function as a dust cap to replace the dust cap 402. In that case, the step of removing the dust cap 402 may be eliminated. Then, the technician may engage the connector shroud 610 by slipping the tip of fiber optic cable 202 through the connector shroud 610 and connecting the connector shroud 610 to the shroudless ferrule 401. In this embodiment, the connector shroud 610 is of the type of SC/APC which snaps onto the shroudless ferrule 401. But other types of connector shroud are contemplated for connecting the fiber optic connector 210. After engaging the connector shroud 610 on the shroudless ferrule 401, the technician may connect the fiber optic cable 202 to an optical device.

Figure 7:
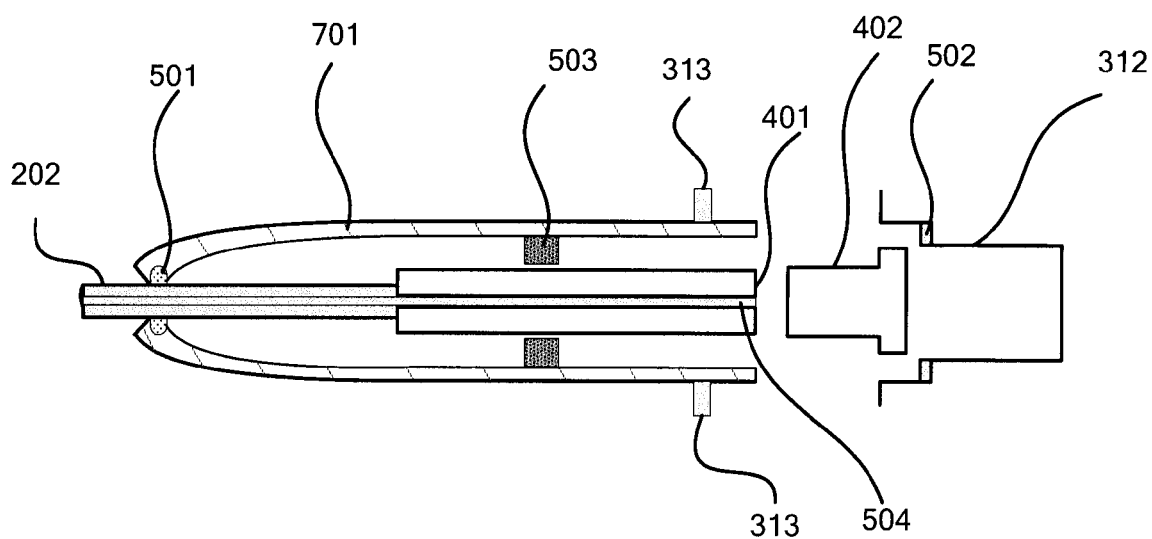
FIG. 7 illustrates an exploded view of the fiber optic connector of FIG. 3 in accordance with another exemplary embodiment of the present disclosure.

FIG. 7 illustrates an exploded view of a fiber optic connector of FIG. 3 in accordance with another exemplary embodiment of the present disclosure. In this example of FIG. 7, cover 701 is reinforced as a casing filled with resin. This embodiment of the fiber optic connector 700 may be used in a similar way as described in FIGS. 5-6.

Figure 8:
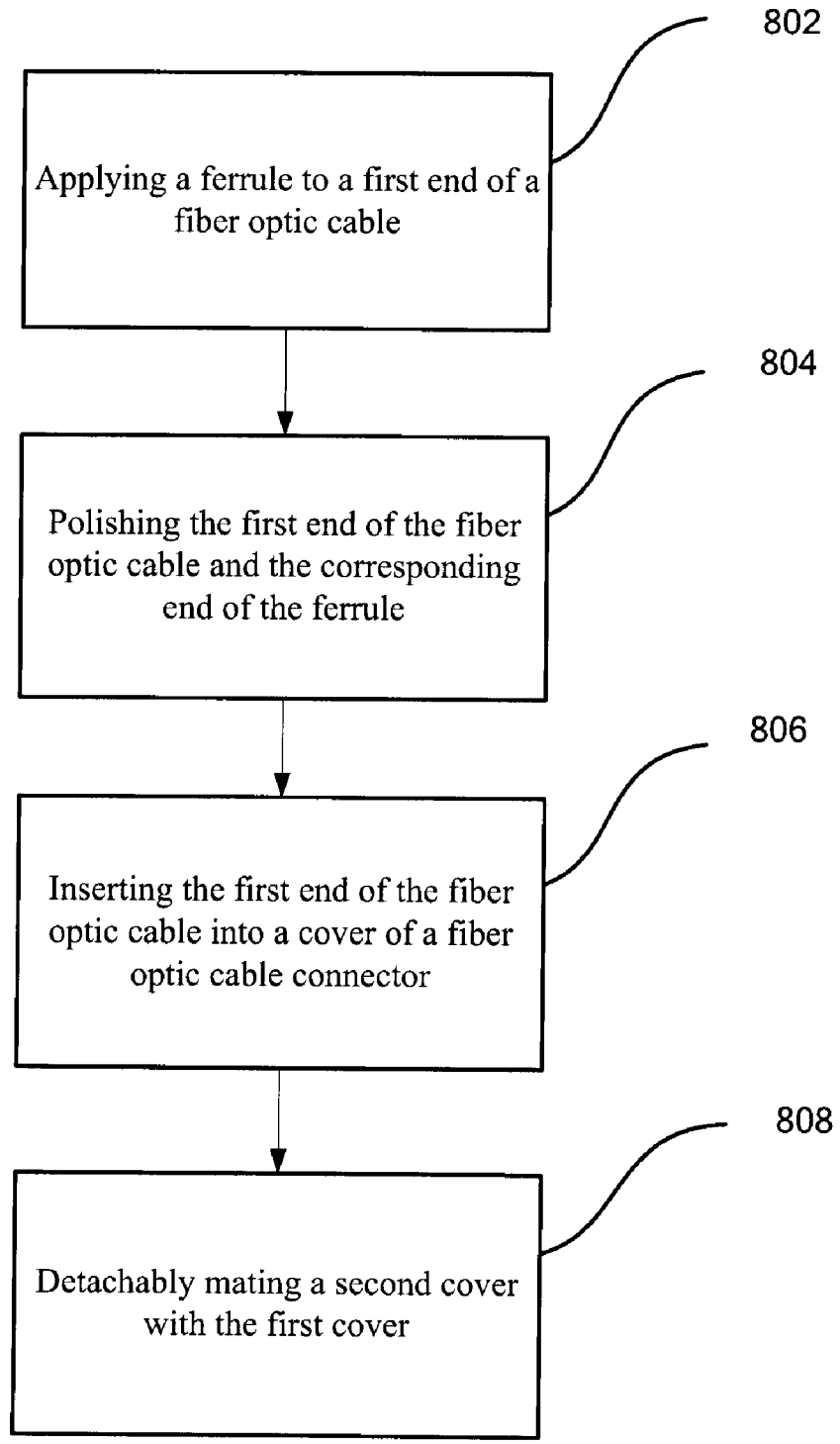
FIG. 8 illustrates an exemplary flow diagram for applying a fiber optic connector to a fiber optic cable, in accordance with an exemplary embodiment of the present disclosure.

FIG. 8 illustrates an exemplary flow diagram for applying a fiber optic connector to a fiber optic cable, in accordance with an exemplary embodiment of the present disclosure. This exemplary method is provided by way of example, as there are a variety of ways to carry out methods. The flow diagram 800 may begin at block 802. In block 802, a ferrule 401 may be applied to a first end of a fiber optic cable 202. In other embodiments, the ferrule 401 may be applied at a different time, e.g., prior to a connector shroud being connected to the fiber optic cable 202. In block 804, the ferrule terminated fiber optic cable may be polished. For example, the ferrule 401 and the end of the optical fiber 504 with the ferrule 401 are typically polished to a finish conforming to one of a variety of industry standards, such as PC, APC or UPC. In block 806, the end of the fiber optic cable 202 with the polished ferrule 401 is inserted into a first cover 311 of a fiber optic connector 210. The first cover 311 may be slid along the fiber optic cable 202. In block 808, a second cover 312 may engage the first cover 311 via the restraining mechanisms, e.g., the lock pins 313 and channels. In addition, a dust cap 402 may be placed over the ferrule terminated fiber optic cable prior to the second cover 312 engaging the first cover 311.

The fiber optic connector 210 may be used to protect the terminating end of a fiber optic cable 202. More specifically, the fiber optic connector 210 may be used to protect the polished end of a fiber optic cable 202 having a polished shroudless ferrule 401 at the deployment of a fiber optic cable 202. The fiber optic cable connector 210 also may be reinforced to assist in protecting the polished pieces from inclement weather prior to being installed in a subscriber's premise. In addition, the fiber optic cable 202 does not require a connector shroud prior to final installation. Connector shrouds are expensive and can be damaged in the period between the fiber optic cable drop and final installation into a subscriber's premise. Moreover, without the need of a bulky connector shroud, the fiber optic cable 202 having a fiber optic connector 210 can pass through a smaller conduit during the final installation compared to a fiber optic cable 202 having a connector shroud. After passing through the conduit, the connector shroud can be attached as described above. Thus, key features of the various embodiments in accordance of the present disclosure are the reduced size combined with weather protection. The fiber optic connector 210 according to the various embodiments of the disclosure may improve fiber optic deployment efficiency and reduce hardware cost.

In the preceding specification, various preferred embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

The invention claimed is:

1. A connector comprising:
   a first cover comprising an integral restraining mechanism and being adapted to receive a fiber optic cable having a shroudless ferrule attached at about a first end of the fiber optic cable, whereby the first cover slidingly engages the fiber optic cable; and
   a second cover comprising a reciprocal restraining mechanism, the reciprocal restraining mechanism detachably mating with the integral restraining mechanism of the first cover.

2. The connector according to claim 1, wherein the restraining mechanism comprises at least one lock pin and the reciprocal restraining mechanism comprises at least one channel that receives the at least one lock pin.

3. The connector according to claim 1, further comprising a gasket at about the end of the first cover adapted to receive the fiber optic cable, whereby the gasket forms a seal between the first cover and the fiber optic cable.

4. The connector according to claim 1, wherein the second cover further comprises a gasket creating a seal between the second cover and the first cover when the first cover and second cover are detachably mated.

5. The connector according to claim 1, wherein the first cover further comprises a ferrule spacer that orients the ferrule at about a radial center of the first cover.

6. The connector according to claim 5, wherein the ferrule spacer attaches to the inner surface of the first cover.

7. The connector according to claim 1, wherein the first cover is a resin filled casing.

8. The connector according to claim 1, further comprising a dust cap adapted to cover the first end of the fiber optic cable.

9. A fiber optic connector assembly comprising:
   a fiber optic cable;
   a shroudless ferrule attached at about a first end of the fiber optic cable;
   a first cover comprising an integral restraining mechanism, wherein the first cover receives the first end of the fiber optic cable and substantially surrounds at least a portion of the fiber optic cable and at least a portion of the shroudless ferrule, the first cover slidingly engaging the fiber optic cable; and
   a second cover detachably mated to the first cover at a distal end of the fiber optic connector assembly by a reciprocal restraining mechanism, wherein the first cover and second cover form an integral housing substantially enclosing the ferrule.

10. The fiber optic connector assembly according to claim 9, further comprising a dust cap detachably covering the first end of the fiber optic cable.

11. The fiber optic connector assembly according to claim 9, wherein the integral restraining mechanism of the first cover comprises at least one lock pin and the reciprocal restraining mechanism comprises at least one channel that receives the at least one lock pin.

12. The fiber optic connector assembly according to claim 9, further comprising a gasket at about the end of the first cover receiving the fiber optic cable, whereby the gasket forms a seal between the first cover and the fiber optic cable.

13. The fiber optic connector assembly according to claim 9, wherein the second cover further comprises a gasket creating a seal between the second cover and the first cover when the first and second covers are detachably mated.

14. The fiber optic connector assembly according to claim 9, wherein the shroudless ferrule is polished to an Angled Physical Contact (APC) finish.

15. The fiber optic connector assembly according to claim 9, wherein the shroudless ferrule is polished to at least one of Physical Contact (PC) and Ultra Physical Contact (UPC).

16. The fiber optic connector assembly according to claim 9, the first cover further comprising a ferrule spacer orienting the shroudless ferrule at about a radial center of the first cover.

17. The fiber optic connector assembly according to claim 9, wherein the ferrule spacer attaches to the inner surface of the first cover.

18. A method comprising:
   applying a shroudless ferrule to a first end of a fiber optic cable;
   polishing the first end of the fiber optic cable and the corresponding end of the shroudless ferrule;
   inserting the first end of the fiber optic cable into a first cover of a fiber optic cable connector, whereby the first cover slidingly engages the fiber optic cable; and
   detachably mating a second cover with the first cover.

19. The method according to claim 18, further comprising covering the first end of the fiber optic cable with a dust cap.

20. The method according to claim 18, further comprising:
   removing the second cover from the first cover;
   sliding the first cover towards the end opposite the first end; and
   connecting a connector shroud to the first end of the fiber optic cable.

* * * * *